United States Patent [19]

Miller

[11] 4,453,259

[45] Jun. 5, 1984

[54] DIGITAL SYNCHRONIZATION TECHNIQUE

[75] Inventor: Chauncey S. Miller, Rancho Palos Verdes, Calif.

[73] Assignee: TRW Inc., Redondo Beach, Calif.

[21] Appl. No.: 370,016

[22] Filed: Apr. 20, 1982

[51] Int. Cl.$^3$ .............................................. H04L 7/02
[52] U.S. Cl. ...................................... 375/106; 328/72
[58] Field of Search ................. 375/11, 106, 114, 118, 375/113, 106, 110; 370/100, 102, 108; 371/42, 371/47; 328/63, 72

[56] References Cited

U.S. PATENT DOCUMENTS

| | | | |
|---|---|---|---|
| 3,754,098 | 8/1973 | Abramson et al. | 375/118 |
| 4,027,100 | 5/1977 | Ishiguro | 375/118 |
| 4,119,796 | 10/1978 | Jones | 375/118 |
| 4,181,975 | 1/1980 | Jenkins | 375/118 |
| 4,242,755 | 12/1980 | Gauzan | 375/114 |
| 4,270,183 | 5/1981 | Robinson et al. | 375/118 |
| 4,323,790 | 4/1982 | Dunning et al. | 370/102 |

*Primary Examiner*—Robert L. Griffin
*Assistant Examiner*—Stephen Chin
*Attorney, Agent, or Firm*—Robert W. Keller; Donald R. Nyhagen; Noel F. Heal

[57] ABSTRACT

Method and apparatus for providing a sequence of digitized samples to a modem in substantial synchronism with the incoming signal baud rate, but without using a variable sampling frequency. An incoming signal is sampled at a fixed rate, stored temporarily in a buffer memory, and then interpolated using a digital interpolation filter to provide a sequence of interpolated samples that are equivalent to those that would have been obtained if a variable-frequency sampling rate had been used. Any relative delay between the samples supplied to the modem and the baud rate is sensed and accumulated in an up/down counter. Then the accumulated delay stored in the counter is used to control the selection of coefficients for the interpolation filter.

18 Claims, 6 Drawing Figures

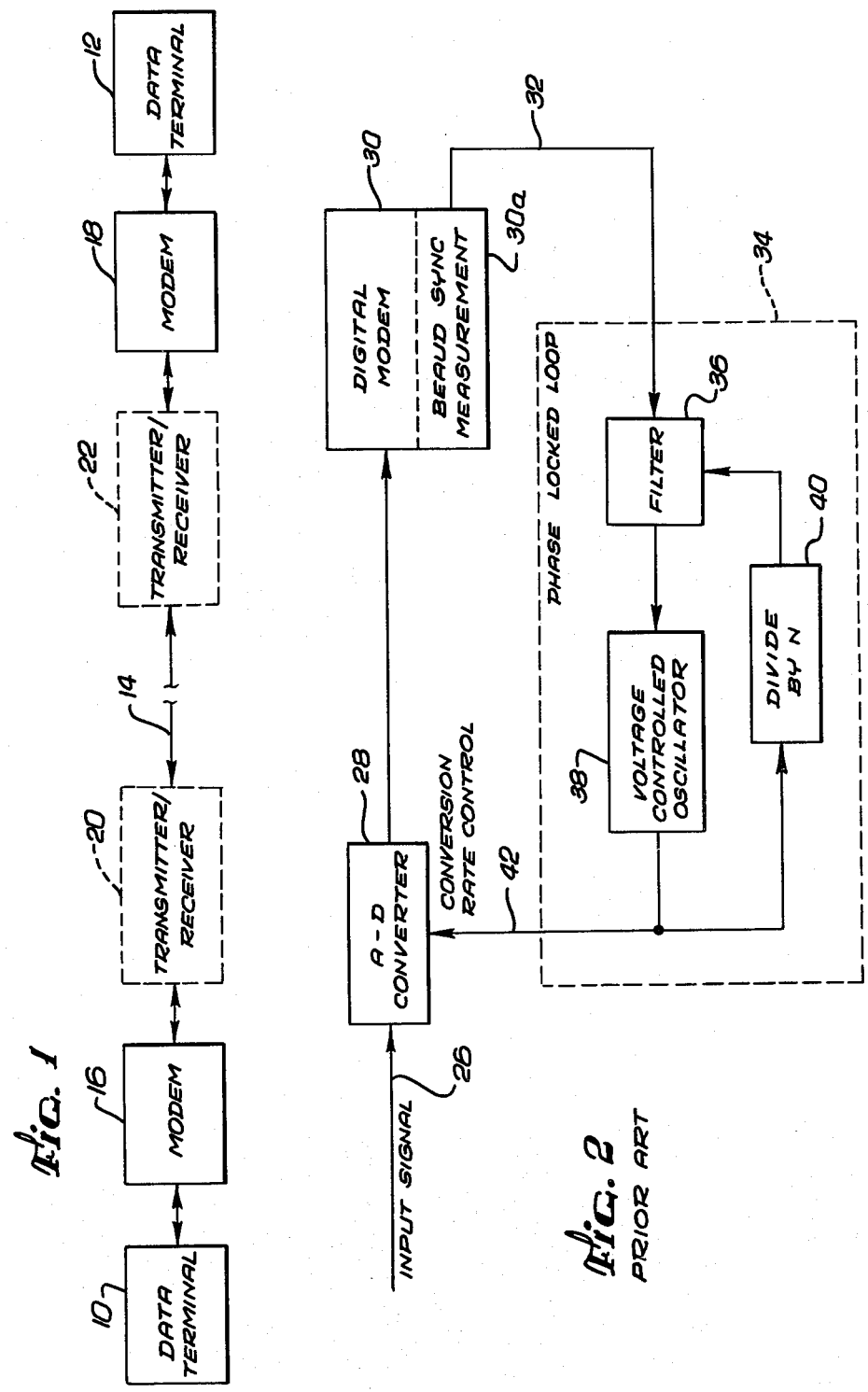

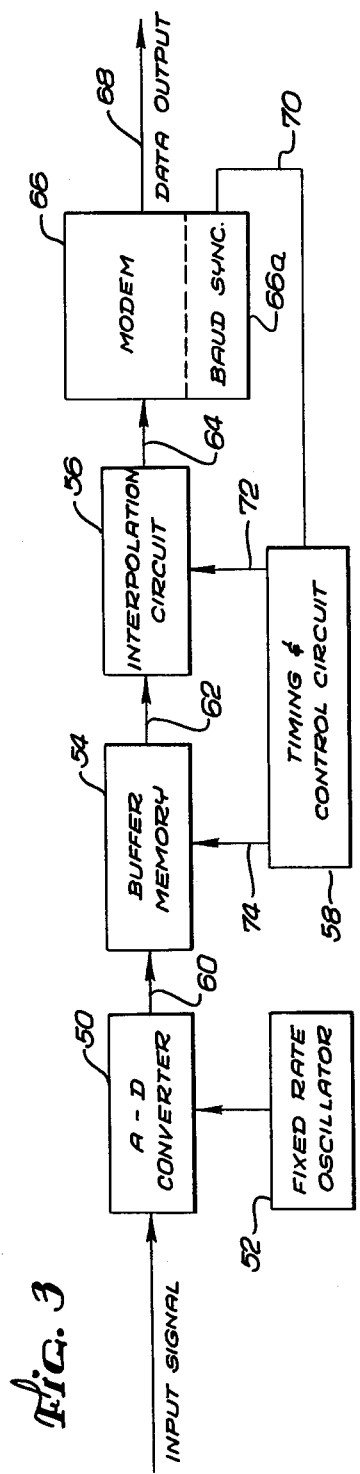
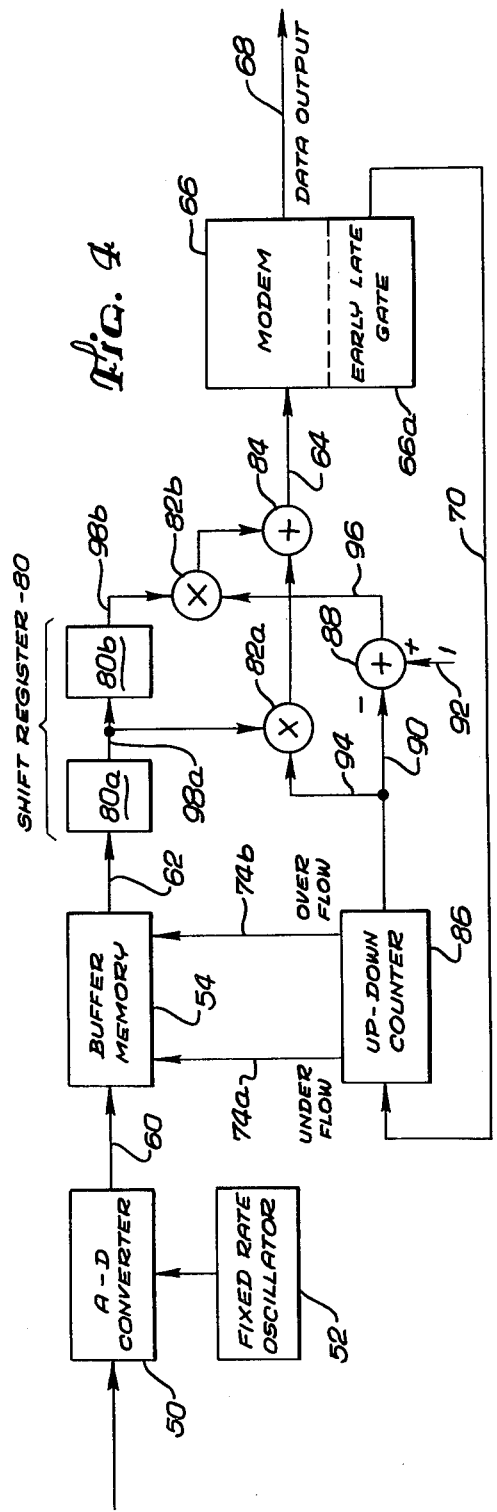

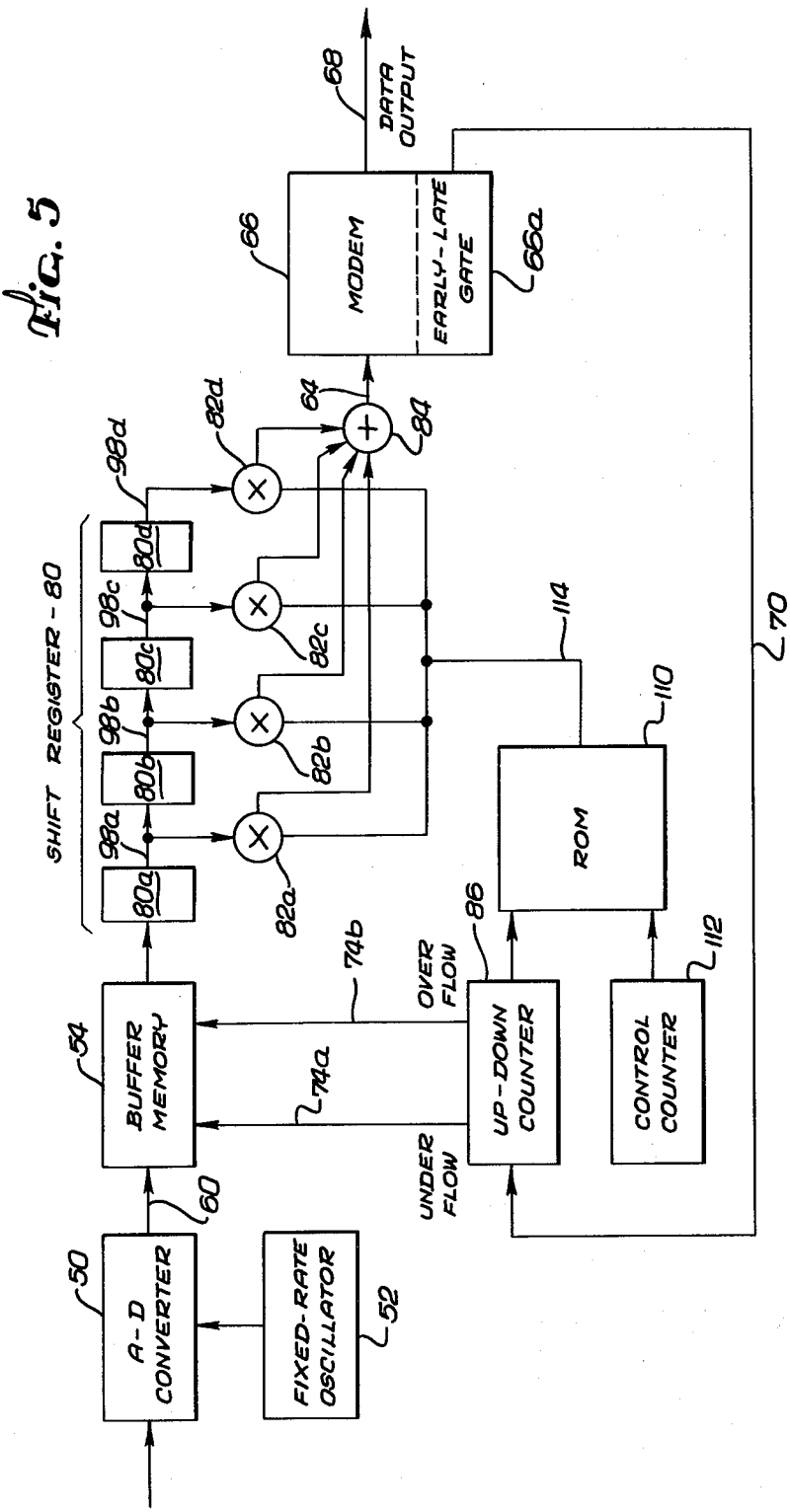

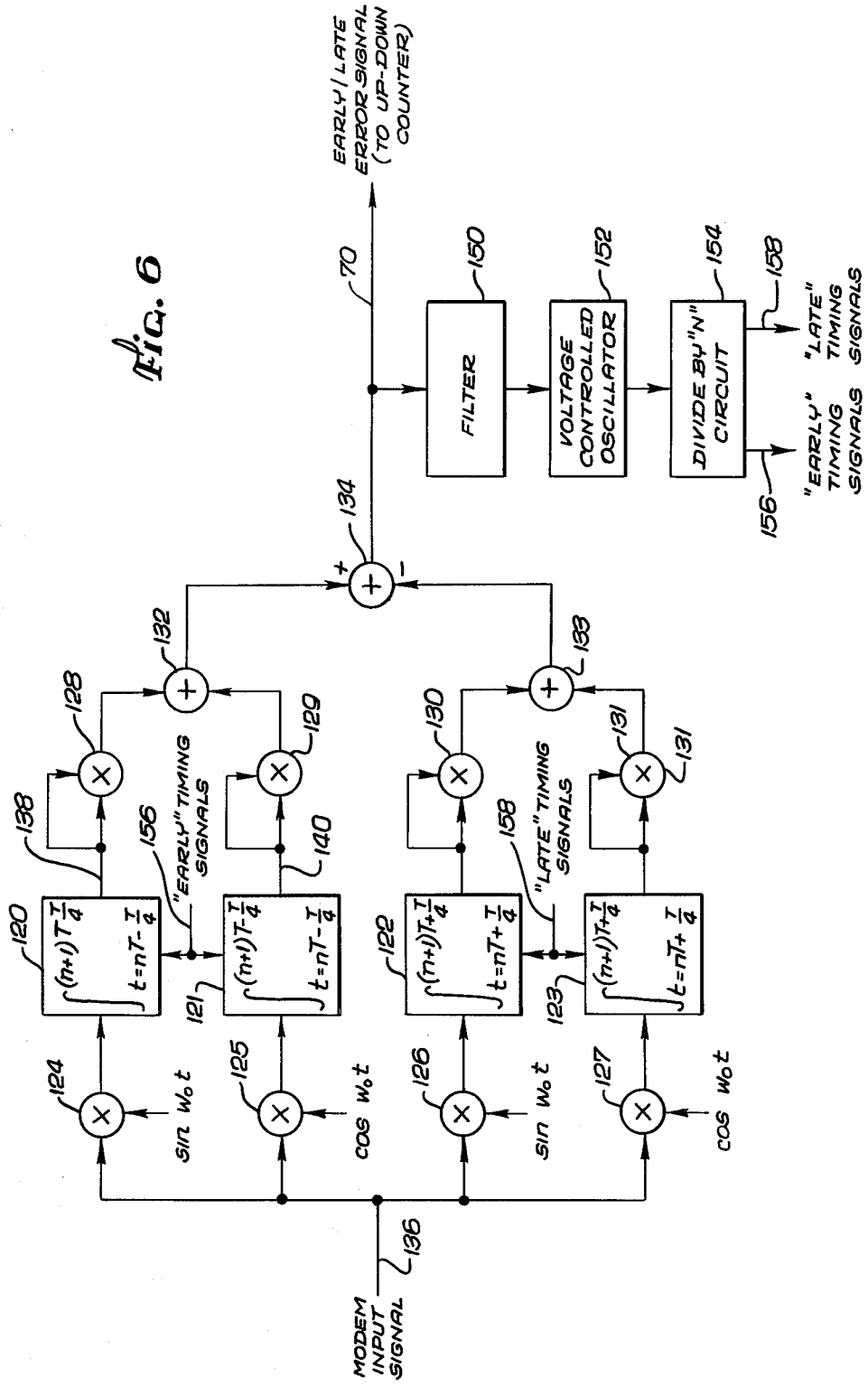

DIGITAL SYNCHRONIZATION TECHNIQUE

BACKGROUND OF THE INVENTION

This invention relates generally to digital modulator-demodulators (modems), and, more particularly, to techniques for the synchronization of modulators and demodulators. In communications systems, digital information is typically transmitted by encoding it onto a high-frequency oscillatory signal known as a carrier signal. The carrier signal is said to be modulated by the information signals, and in general the modulation of the carrier signal may be to its amplitude, frequency or phase, or a combination of these.

In the transmission of digital data, the modulation technique often employed is phase shift keying, in which the phase of the carrier signal is changed or shifted by a preselected amount to indicate a discrete informational element known as a baud. The baud may represent one or more binary digits or bits of information. Although phase shift keying is mentioned from time to time in this specification, it will be understood that the invention to be described is not limited to a particular modulation approach.

In digital modems, not only is the data to be transmitted in digital form but the carrier signal is manipulated in the modems in digital form. At the sending end of the communication system, digital samples representing the modulated carrier signal are converted to an analog signal for transmission, and, at the receiving end of the system, the received analog signals are first digitized in an analog-to-digital converter.

From this brief introduction, one can appreciate that it is highly desirable to synchronize the demodulation and modulation equipment as closely as possible. However, since the demodulator and modulator are usually located remotely from each other, this is not always a simple matter. Prior to this invention, the technique invariably employed was to provide a variable-frequency oscillator to control the sampling rate at the receiving end, and to synchronize this sampling rate with the modulation rate, or baud rate, by means of a conventional phase-locked loop.

Although synchronization by means of a phase-locked loop is satisfactory in many applications, it is most unsatisfactory in any system in which the modem function is performed by a computer or processor that is also used either to perform other computational functions, or to perform the functions of multiple modems. Whenever a conventional serial processor is used for more than one function, priorities must be assigned such that the most important functions are performed first. If synchronization is to be accurately maintained, then clearly the modem function would have to have the highest priority. But if the same processor is handling multiple modems, the accuracy of synchronization will necessarily suffer to some degree. In many applications, the modem processor is also emoloyed to process data in "real time," i.e., as soon as possible after the occurrence of some real event from which the data being processed is derived. An example is the processing of speech in digital form. Such real-time processing frequently also requires the highest level of priority if the integrity of the data is to be maintained. Obviously, then, performance will be degraded in some manner in such a situation, either because synchronization has not been accurately maintained, or because the processing of the data has not been given the priority it demands.

It will be apparent from the foregoing that there is a significant need in the modem field for a synchronization technique that avoids these problems arising from the use of a variable-frequency oscillator in conjunction with a phase-locked loop. The present invention fulfills this need.

SUMMARY OF THE INVENTION

The present invention resides in a digital modem synchronization technique in which signal samples are converted to digital form at a fixed rate, and an interpolation circuit is used to obtain a new set of samples corresponding to those that would have been obtained if a variable sampling rate had been synchronized with the baud rate of the received signals. In effect, then, the invention provides a modem with samples that are synchronized with the baud rate, but does so without requiring changes in the input sampling rate. Stated another way, the effective frequency of signal samples provided to the modem is decoupled from the input sampling rate. Because of this decoupling, a single processor can be used to time-share operations on multiple modems, or on other computation tasks, without any degradation of performance due to perturbations in synchronization.

Briefly, and in general terms, the apparatus of the present invention includes sampling means operated at a fixed sampling rate, buffer means for temporarily storing samples, and interpolation means for providing an interpolated sequence of samples equivalent to samples that would have been obtained if the sampling rate had been synchronized with the signal baud rate. Also included are means for detecting whether the modem input signal is early or late compared with the baud rate, signal, and timing and control means for controlling operation of the buffer means and the interpolation means in response to signals from the means for detecting whether the input signal is early or late.

In one presently preferred embodiment of the invention, the buffer means is a buffer memory operating as a first-in-first-out storage device, and the interpolation means includes a digital interpolation filter having coefficients provided by the timing and control means, which includes an up-down counter. An early/late signal is applied to the up-down counter at the baud rate, and the counter provides an indication of the accumulated delay between the interpolated samples and the fixed-rate samples. This accumulated delay, referred to as the delay index, determines the filter coefficients. When there is a further drift detected in the difference between the interpolated samples and sampling rate, the delay index is changed, the filter coefficients are changed, and a new interpolation of the samples corrects for the drift.

In its simplest form the interpolation filter has only two coefficients, which can be conveniently derived from the up-down counter using only a single adder circuit. For the more general case, and to provide greater accuracy of interpolation, the interpolation filter has more than two coefficients. The coefficients are then stored in a read-only memory (ROM), there being a separate set of coefficients for each possible value of the delay index stored in the up-down counter. Each time that the delay index changes, a new set of coefficients is loaded from the ROM to provide a different interpolation.

In terms of a novel method, the invention includes the steps of sampling an incoming communications signal at a fixed sampling rate, storing the samples in a buffer memory, and interpolating the stored samples to provide an interpolated sequence of samples equivalent to the samples that would have been obtained if the sampling rate had been synchronized with the baud rate.

More specifically, the interpolated signals are input to a conventional modem for demodulation, and the modem provides a baud synchronization signal indicative of any offset between the interpolated signals and the baud rate. In accordance with the novel method of the invention, the up-down counter is either left unchanged, or is counted up or down at each baud transition time, if the baud synchronization signal indicates that the interpolated samples should be advanced or retarded with respect to the baud rate. The contents of the up-down counter is, therefore, a delay index indicative of the accumulated time delay or offset between the original samples and the baud rate. A set of interpolation filter coefficients is selected in accordance with the value of the delay index, and the samples from the buffer memory are interpolated by the filter, using the selected filter coefficients.

If the baud rate, as determined at the sending end of the communications system, is consistently different from the fixed sampling rate at the demodulator, the delay index in the up-down counter will be continually counted either up or down, depending on the sign of the frequency difference. In accordance with an important aspect of the invention, an appropriate signal is transmitted to the buffer memory when the up-down counter overflows or underflows. When signaled in this manner, the buffer memory either skips a sample or repeats a sample. This compensates for the occurrence of counter "wrap-around," and presents the modem with samples that have resulted from a smooth interpolation, free of time discontinuities.

It will be appreciated from the foregoing that the present invention represents a significant advance in the field of digital modems. In particular, the invention decouples the function of modem synchronization from the input sampling rate, and allows a modem processor to operate in a time-sharing mode without degradation of synchronization or of other processor functions. Other aspects and advantages of the invention will become apparent from the following detailed description, taken in conjunction with the accompanying drawings.

BRIEF DESCRIPTION OF THE DRAWINGS

FIG. 1 is a block diagram showing the relationship of a modem to a typical communications system;

FIG. 2 is a block diagram showing how modem synchronization was accomplished in the prior art;

FIG. 3 is a block diagram of the digital synchronization apparatus of the present invention;

FIGS. 4 and 5 are block diagrams similar to FIG. 3, and showing two specific embodiments of the invention in more detail; and FIG. 6 is a block diagram of a typical baud synchronization detection circuit that could be used in conjunction with the apparatus of the invention.

DESCRIPTION OF THE PREFERRED EMBODIMENTS

As shown in the drawings for purposes of illustration, the present invention is concerned with digital modems and with a novel technique for the synchronization of sending and receiving modems. The word "modem" is a contraction of modulator-demodulator. Although modulation and demodulation are separate functions, they are frequently both performed by a single piece of equipment, or by two pieces of equipment sharing a common housing and usually a great deal of common circuitry. This is particularly true of digital modems, in which modulation and demodulation are often performed by the same digital processor.

FIG. 1 shows a typical bi-directional communications system, including two data terminals, indicated by reference numerals 10 and 12 and serving as a data source and a data destination, a communications channel 14, and two modems 16 and 18 coupling the data terminals to the communications channel. If the communications channel 14 uses radio for data transmission, two transmitter/receivers 20 and 22, shown in broken lines, will also be required in most cases. If the channel 14 is a wireline channel or a fiberoptic link, the modems 16 and 18 will couple directly to the channel. In any event, the function of the modem in data transmission is to modulate a high-frequency carrier signal with a stream of digital data to be transmitted. A variety of modulation approaches is possible, but typically some form of phase-shift keying is employed, sometimes combined with amplitude modulation. In phase-shift keying, the phase of the carrier signal is changed by a preselected amount at the beginning of each discrete signal element, known as a baud.

In digital modems, the received carrier signal is first sampled and converted to a sequence of corresponding digital values, which are then manipulated digitally to demodulate the received signal and regenerate the transmitted digital information. It is highly desirable in such communications systems to synchronize the sampling rate at the receiving end with an exact multiple of the signal baud rate, as determined at the sending end. In the past, this has been accomplished by means of a phase-locked loop coupled to a variable-frequency oscillator controlling the sampling rate at the receiving end. However, this approach does not work satisfactorily when demodulation is effected by a processor operating in a time-sharing mode.

The prior art technique is shown by way of example in FIG. 2. The input signal, shown at 26, is applied as an input to an analog-to-digital converter 28, the digital outputs from which are applied to a digital modem 30. A portion of the modem 30 is a baud synchronization detection circuit 30a, which provides a signal over line 32 to a phase-locked loop 34. The loop 34 employs a filter 36, a voltage-controlled oscillator 38 and a divide-by-n circuit 40, to provide an output on line 42 to control the sampling rate of the analog-to-digital converter 28.

In accordance with the present invention, analog-to-digital conversion is performed at a fixed rate, independent of the baud rate, and the resulting samples are stored temporarily and then interpolated to obtain an interpolated set of samples equivalent to samples that would have been obtained if the sampling rate had been synchronized with the baud rate. As shown in basic form in FIG. 3, the apparatus of the invention includes an analog-to-digital (A-D) converter 50 controlled by a fixed-rate oscillator 52, a buffer memory 54, an interpolation circuit 56, and a timing and control circuit 58. The A-D converter 50 transmits digital samples over parallel lines, indicated at 60, to the buffer memory 54, which is a conventional set of shift registers operating on a first-in-first-out (FIFO) basis, such that the sequence of digital samples is delayed by several sample times. The output samples from the buffer memory 54 are transmitted to the interpolation circuit 56 over lines 62. The interpolation circuit, as will shortly be appreciated, provides a set of interpolated samples on line 64, which is coupled to a conventional digital modem, indicated at 66, to provide demodulated output as indicated at 68.

The modem 66 has a baud synchronization detection circuit 66a, and this provides a signal on line 70 to indicate whether the samples input to the modem 66 need to be advanced or retarded in order to be properly synchronized with the baud rate. Line 70 from the modem is connected to the timing and control circuit 58, which is operative to generate control signals to the interpolation circuit 56 on line 72, and to the buffer memory 54 on line 74. Operation of the apparatus shown in FIG. 3 can perhaps be better appreciated by consideration of the more specific embodiments of the invention shown in FIGS. 4 and 5.

As shown in FIGS. 4 and 5, the interpolation circuitry takes the form of a digital filter structured like a finite impulse response (FIR) filter. The filter shown in FIG. 4 includes a shift register 80 having two stages 80a and 80b, two multipliers 82a and 82b, and an adder 84. The timing and control circuit 58 (FIG. 3) includes an up-down counter 86 and another adder 88, connected to perform subtraction. Line 70 from the baud synchronization detection circuit 66a is connected to the up-down counter 86 and functions to increment or decrement the counter, depending on the state of the signal on line 70. The contents of the counter 86 are applied over line 90 as a subtractive input to the adder 88. A second input, shown at 92, is permanently wired to apply a value of unity additively to the adder 88.

The contents of the up-down counter 86 is also applied, over line 94, as one input to the first multiplier 82a, and the output of the adder 88 is applied over line 96 to one input of the second multiplier 82b. The output of the buffer memory 54 is applied over line 62 to the first stage 80a of the shift register, the output from which, indicated at 98a, is connected both as an input to the second stage 80b, and as an input to the second multiplier 82a. Finally, the outputs of the multipliers 82, shown at 100a and 100b, are connected as inputs to the adder 84, the output of which is transmitted over line 64 to the modem 66. Control lines 74a and 74b extend from the up-down counter 86 to the buffer memory 54. As will be further explained, control signals on these lines are generated upon the occurrence of an overflow condition or an underflow condition in the counter 86.

FIG. 5 shows how the system of FIG. 4 is modified for a more accurate interpolation of the signal samples. The shift register is expanded to include four stages 80a–80d, and there are also four multipliers 82a–82d. The only additional components are a read-only memory (ROM) 110 and a counter 112 designated the control counter. As shown by the line 114, the ROM 110 provides coefficient values to the multipliers 82 whenever there is a change in the contents of the up-down counter 86. The control counter in this configuration counts and loads four coefficients from the ROM 110. It will be apparent that this arrangement requires that the multipliers have some storage capability to hold the current values of the filter coefficients until they are next changed.

The principles of operation of the interpolation circuit are well known in the digital signal processing art. A discussion of these principles may be found in a paper by R. W. Schafer and L. W. Rabiner entitled "A Digital Signal Processing Approach to Interpolation," published in the Proceedings of the IEEE, Vol. 61, No. 6, June, 1973, pp. 692–702. For purposes of further discussion, assume that the time interval between samples is t and that the input sampling rate is $f_s = 1/t$. The input sample at time interval k may be defined as $x_k$, and the output of the interpolation filter, $y_m$, is given by the expression:

$$y_m = \sum_{s=0}^{L-1} a_{s,n} x_{k-s},$$

where $a_{s,n}$
$s = 0, 1, 2, \ldots, L-1$
$n = 0, 1, 2, \ldots, N-1$
are the filter coefficients,
and where L is the length (number of stages) of the filter, and N is the number of sub-intervals into which T is divided for purposes of interpolation.

For a particular interpolation delay, n is fixed, and is given by the delay index contained in the up-down counter. Thus, for each possible delay index or interpolation delay there will be a separate set of L filter coefficients $a_s$.

By way of a more specific example, suppose that $L=2$, as in the FIG. 4 embodiment, and $N=32$, meaning that the up-down counter 86 is a five-bit modulo-32 counter. In this simple example, the filter output, $y_m$, is the linear interpolation of consecutive sample pairs, in accordance with the expression:

$$y_m = \frac{n}{N} x_k + \left(1 - \frac{n}{N}\right) x_{k-1}.$$

For $n=0$, it will be seen that $y_m = x_{k-1}$, and for $n=32$, $y_m = x_k$. For $n=16$, $y_m = \frac{1}{2}x_k + \frac{1}{2}x_{k-1}$.

If N is a power of two, as in the example, the required divisions by N can be effected by a simple wiring connection in obtaining the output of the up-down counter 86. For $N=32$, for example, an appropriate right-shift of five bits can be effected.

When the baud rate is not an exact sub-multiple of the fixed input sampling rate, there will be a constant drift or precession between the baud rate and the sampling rate. Each count or increment of the up-down counter 86 represents a relative delay of 1/N of a sample time interval, t. If the counter is incremented from zero to $N-1$, this represents an accumulated delay of $(N-1)/N$ of a sample time. When there is one further increment of delay in the same direction, the counter 86 "wraps around" to zero again, and a full sampling interval of delay has accumulated. When this occurs, the buffer memory 54 is instructed to compensate by providing a repeated sample or by skipping a sample, depending on the direction of the delay. For example, if the sampling rate is slightly faster than the desired baud synchronization rate, and this condition causes the counter 86 to count in the upward direction, overflow of the counter would be used to skip a sample provided from the buffer memory 54. If the sampling rate is slower than desired, and this condition causes the counter 86 to count in a downward direction, counter underflow would be used to provide a repeat sample from the buffer memory 54. In this manner, a smooth interpolation is obtained, free from the effects of time discontinuities.

Detection of baud synchronization in the modem 66 is performed in a conventional manner, and the invention is not limited to any particular approach to the measurement of baud synchronization. For completeness, however, FIG. 6 shows a simplified block diagram of the baud synchronization circuitry 66a for generating the early-late signal on line 70 to the up-down counter 86.

As shown in FIG. 6, the baud synchronization circuitry includes four integrators 120-123, four multipliers 124-127, four additional multipliers 128-131, and three adders 132-134. The modem signal samples are applied to all of the multipliers 124-127, as indicated by lines 136. Multipliers 124 and 126 have as inputs a locally generated carrier frequency signal, as indicated by the expression sin $\omega_0\tau$, and the other two multipliers 125 and 127 have as inputs a locally generated carrier frequency signal indicated by the expression cos $\omega_0\tau$. The output signals from integrators 120 and 121, on lines 138 and 140, reppresent the in-phase and quadrature components of the information signal with which the carrier is modulated. The multiplication by sin $\omega_0\tau$ and cos $\omega_0\tau$ effectively demodulate the received signals. The integrators 120 and 121 are timed to integrate the in-phase and quadrature components over a baud-time interval (T) offset one quarter of an interval in the "early" direction. The results of each integration are each squared in the respective multipliers 128 and 129, which have the same input line applied to both inputs of each multiplier. The squared values are added in adder 132, to provide a value indicative of the composite of the in-phase and quadrature components that have been integrated.

Integrators 122 and 123, multipliers 130 and 131, and adder 133, perform essentially the same function as the circuitry just described, the only difference being the integration interval. In integrators 122 and 123, integration is performed over a baud-time interval that is offset one quarter of an interval in the "late" direction, instead of the early direction.

The outputs of adders 132 and 133 are then combined subtractively in adder 134, the output of which is the early/late signal for application to the up-down counter 86. To appreciate how this circuit operates to provide the desired early/late indication, it is only necessary to consider the effect of the integrations performed on a carrier signal modulated by phase shift keying. If integration were to be performed over precisely one baud-time interval, the result of the integration would be maximized, i.e., it would be greater than the result obtained by integrating over a similar interval offset in one direction or the other from correspondence with a complete baud. This is because there is a phase shift at the transition between adjacent baud-times and this results in a sign change in the function being integrated. Integration on one side of the transition affects the integral positively, and integration on the other side of the transition affects the integral negatively. Hence, the integral taken over precisely one baud interval, from transition to transition, is the maximum integral that can be obtained.

More importantly, the integrals taken over intervals that are equally offset in opposite directions from the "on-time" position will be equal, and will cancel in the adder 134, producing a zero early/late signal as an output. This will not affect the contents of the up-down counter 86, and represents a condition of stabilized interpolation delay. If there is a drift in the timing of the incoming baud rate, this will result in a non-zero output from the adder 134, indicating either an early or a late condition, that is to be corrected by either advancing or retarding the interpolated signal samples by changing the filter co-efficients in the interpolation circuit. By providing an appropriate thresholding circuit (not shown), an "up" or a "down" signal will be applied to the up-down counter 86, when the output of adder 134 is sufficiently positive or negative.

Timing signals for the integrators 120-123 are generated in a conventional manner by means of circuitry including a smoothing filter 150, a voltage-controlled oscillator 152, and a divide-by-n circuit 154. The filter 150 receives the early/late error signal from the adder 134, and provides a filtered output to the voltage-controlled oscillator 152, which in turn provides an oscillatory signal to the divide-by-n circuit 154. The circuit parameters are chosen to provide two oscillatory outputs from the circuit 154, an "early" timing signal on line 156 to integrators 120 and 121, and a "late" timing signal on line 158 to integrators 122 and 123.

It will be appreciated from the foregoing that the present invention represents a significant advance in the field of digital modems. In particular, the invention has effectively eliminated the requirement that the input sampling rate of a modem be synchronized to the incoming baud rate. It will also be appreciated that, although specific embodiments of the invention have been described in detail for purposes of illustration, various modifications may be made without departing from the spirit and scope of the invention. Accordingly, the invention is not to be limited except as by the appended claims.

I claim:

1. For use with a data communications receiving-end modem, digital synchronization apparatus, comprising:
    sampling means, for sampling at a fixed sampling rate a data signal that was transmitted at a baud rate not necessarily in synchronism with the sampling rate;
    buffer means, for temporarily storing signal samples derived from said sampling means;
    interpolation means, coupled to said buffer means, for providing to the modem an interpolated sequence of signal samples effectively synchronized with the data signal baud rate;
    baud synchronization detection means, for detecting whether the interpolated sequence of signal samples supplied to the modem is in synchronism with the baud rate; and
    timing and control means, for controlling operation of said buffer means and said interpolation means in response to signals from said baud synchronization detection means, to maintain the interpolated sequence of signal samples substantially in synchronism with the baud rate.

2. Digital synchronization apparatus as set forth in claim 1, wherein:
    said baud synchronization means generates an early/late signal indicative of whether the interpolated sequence of signal samples applied to the modem are early or late with respect to the baud rate;
    said timing and control means includes an up-down counter for registering an accumulated interpolation delay indicative of the accumulated relative delay between the sampling rate and the baud rate, by counting up or down in response to the early/late signal; and said interpolation means includes an interpolation filter having filter coefficients provided by said timing and control means.

3. Digital synchronization apparatus as set forth in claim 2, wherein:

said buffer means includes means for generating a repeated sample on command and means for skipping a sample on command;

said up-down counter includes means for generating an overflow signal and an underflow signal whenever the contents of said counter overflows or underflows; and the overflow and underflow signals are coupled to said buffer means, to provide for a repeated sample or a skipped sample in the event that the contents of said up-down counter overflows or underflows.

4. Digital synchronization apparatus as set forth in claim 2, wherein:

said timing and control means further includes means coupled to said up-down counter, for selecting a new set of filter coefficients in response to a change in the accumulated interpolation delay registered in said up-down counter.

5. Digital synchronization apparatus as set forth in claim 3, wherein:

said timing and control means further includes means coupled to said up-down counter, for selecting a new set of filter coefficients in response to a change in the accumulated interpolation delay registered in said up-down counter.

6. Digital synchronization apparatus as set forth in claim 4 wherein:

said interpolation filter has two stages; and said means coupled to said up-down counter includes a subtraction circuit, and derives a first filter coefficient from the contents of said counter and a second filter coefficient from the difference between unity and the contents of said counter, as determined in said subtraction circuit.

7. Digital synchronization apparatus as set forth in claim 5, wherein:

said interpolation filter has two stages; and said means coupled to said up-down counter includes a subtraction circuit, and derives a first filter coefficient from the contents of said counter and a second filter coefficient from the difference between unity and the contents of said counter, as determined in said subtraction circuit.

8. Digital synchronization means as set forth in claim 4, wherein:

said interpolation filter has more than two stages; and said means coupled to said up-down counter includes a read-only memory for storage of n sets of filter coefficients, where n is the number of possible states of said counter, and means for retrieving a set of filter coefficients from said read-only memory in response to a change in the state of said counter.

9. Digital synchronization means as set forth in claim 5, wherein:

said interpolation filter has more than two stages; and said means coupled to said up-down counter includes a read-only memory for storage of n sets of filter coefficients, where n is the number of possible states of said counter, and means for retrieving a set of filter coefficients from said read-only memory in response to a change in the state of said counter.

10. For use with a data communications receiving-end modem, digital synchronization apparatus, comprising:

an analog-to-digital converter for converting to digital form samples of a data signal received at baud rate determined at a remote transmitter;

a fixed-frequency oscillator for controlling said converter to provide digital signal samples at a fixed sampling rate not necessarily in synchronism with the signal baud rate;

a buffer register for temporarily storing the digital signal samples on a first-in-first-out basis;

an interpolation filter connected to receive as inputs temporarily stored signal samples from said buffer register, and to provide as outputs to a modem interpolated signal samples that are effectively synchronized with the data signal baud rate;

baud synchronization detection means, for detecting whether the interpolated signal samples supplied to the modem are in synchronism with the baud rate, and for generating an early/late signal to indicate whether the interpolated signals are early or late with respect to the baud rate;

an up-down counter for registering an accumulated interpolation delay in response to the early/late signals applied to increment or decrement the contents of said counter; and means coupled to said up-down counter, for selecting a new set of interpolation filter coefficients in response to a change in the accumulated interpolation delay registered in said up-down counter.

11. Digital synchronization apparatus as set forth in claim 10, wherein:

said buffer register includes means for generating a repeated sample on command and means for skipping a sample on command;

said up-down counter includes means for generating an overflow signal and an underflow signal whenever the contents of said counter overflows or underflows; and the overflow and underflow signals are coupled to said buffer register, to provide for a repeated sample or a skipped sample in the event that the contents of up-down counter overflows or underflows.

12. Digital synchronization apparatus as set forth in claim 10, wherein:

said interpolation filter has two stages; and said means coupled to said up-down counter includes a subtraction circuit, and derives a first filter coefficient from the contents of said counter and a second filter coefficient from the difference between unity and the contents of said counter, as determined in said subtraction circuit.

13. Digital synchronization apparatus as set forth in claim 11, wherein:

said interolation filter has two stages; and said means coupled to said up-down counter includes a subtraction circuit, and derives a first filter coefficient from the contents of said counter and a second filter coefficient from the difference between unity and the contents of said counter, as determined in said subtraction circuit.

14. Digital synchronization apparatus as set forth in claim 10, wherein:

said interpolation filter has more than two stages; and said means coupled to said up-down counter includes a read-only memory for storage of n sets of filter coefficients, where n is the number of possible states of said counter, and means for retrieving a set of filter coefficients from said read-only memory in response to a change in the state of said counter.

15. Digital synchronization apparatus as set forth in claim 11, wherein:
said interpolation filter has more than two stages; and
said means coupled to said up-down counter includes a read-only memory for storage of n sets of filter coefficients, where n is the number of possible states of said counter, and means for retrieving a set of filter coefficients from said read-only memory in response to a change in the state of said counter.

16. A method of synchronizing samples provided to a receiving-end modem without using a variable sampling rate, said method comprising the steps of:
sampling at a fixed rate a data signal that was transmitted at a baud rate not necessarily in synchronism with the sampling rate;
storing the samples sequentially in a buffer memory;
retrieving the stored samples from the buffer memory on a first-in-first-out basis; and
interpolating the retrieved samples to provide an interpolated sequence of samples equivalent to samples that would have been obtained if the sampling rate had been synchronized with the baud rate.

17. A method of synchronizing samples provided to a receiving-end modem without using a variable sampling rate, said method comprising the steps of:
sampling at a fixed rate a data signal that was transmitted at a baud rate not necessarily in synchronism with the sampling rate;
storing the samples sequentially in a buffer memory;
retrieving the stored samples from the buffer memory on a first-in-first-out basis;
interpolating the retrieved samples to provide an interpolated sequence of samples equivalent to samples that would have been obtained if the sampling rate had been synchronized with the baud rate;
periodically measuring the relative delay between the interpolated samples and the baud rate;
accumulating the measured relative delay, to provide an accumulated delay index; and
selecting a set of interpolation filter coefficients for use in said interpolation step, based on the current value of the accumulated delay index.

18. A method as set forth in claim 17, wherein:
said accumulating step includes incrementing or decrementing a counter, the contents of which represents the accumulated delay index; and
said selecting step includes retrieving the appropriate coefficients from a read-only memory.

* * * * *